Patented May 3, 1932

1,856,303

UNITED STATES PATENT OFFICE

HAROLD E. WHITE, OF BUTLER, PENNSYLVANIA, ASSIGNOR TO LAVA CRUCIBLE COMPANY, OF PITTSBURGH, PENNSYLVANIA, A CORPORATION OF PENNSYLVANIA

METHOD AND MATERIAL EMPLOYED IN THE MANUFACTURE OF REFRACTORY ARTICLES

No Drawing. Application filed February 5, 1929. Serial No. 337,725.

This invention relates to the method and material employed in the manufacture of refractory articles, such as bricks, blocks, furnace linings, and crucibles or melting pots for metals, glass and similar substances.

At the present time, many refractory articles of the character mentioned are made partly or entirely from mullite or its equivalent, but they are not entirely satisfactory due to susceptibility of spalling; that is, breaking off or fracture through temperature changes. It is the prime object of the present invention to overcome this objection or drawback.

I have found that the addition of aluminum, magnesium, or other metallic powder which re-acts similarly to aluminum, to such a refractory plays the important part of controlling the shrinkage of the article and, as a result thereof, I am able to produce a refractory not as susceptible to spalling as refractory ware now on the market.

In carrying out the invention a metal, for instance, aluminum or magnesium, alone or a mixture or alloy thereof, for instance, ferro-aluminum, in a finely divided state is used. A small quantity of said metallic powder is added to bauxite, bauxite and kaolin, or bauxite with a clay binder, or bauxite, kaolin and clay. The proportion of the metallic powder to the bauxite or mix may be from 1% to 10%. As the metal, particularly aluminum powder, oxidizes below the vitrification point of the ceramic body, by formulating the proper mixtures, a metallic mixture can be made up having a corresponding analysis to the metals of the oxides in use in the ceramic body, as for instance, mixtures of aluminum and silicon.

By this process, it is possible to use raw bauxite or a mix containing the same and obtain a finished article, without first calcining the bauxite or mix. The bauxite or mix including the metallic powder is then heated, for instance, in an electric furnace, to a temperature in the neighborhood of 3200 degrees F., which converts it in the main to mullite. It is possible to facilitate the growth of the mullite crystal by further additions to the bauxite before heating, of iron powder or obviously mixtures of iron and aluminum powder, or so-called ferro-aluminum can be used. The articles prepared according to the invention thus overcome the necessity of first calcining the bauxite or mix, and also are free from danger of spalling.

It is generally understood that the presence of small quantities of iron facilitates the growth of mullite crystals. For this reason it is found advisable to add small quantities of ferro-aluminum powder, magnesium, silicon, or other metals or alloys of the aluminum magnesium group. This may be done by using as the base the raw materials containing no crystals, such as bauxite, kaolin, diaspore, gibbsite, or other high alumina clay, or it may be done by using sillimanite, cyanite, andaulsite, or other minerals which on heating are converted into mullite crystals.

It is to be understood that, although the invention is practiced in connection with artificial mullite, in the example given, the same may be practiced as well in connection with natural mullite and mixtures of mullite and bauxite, alone or with other materials forming a mix, and the term "mullite", therefore, is to be broadly construed as covering natural or artificial mullite and the same alone or in combination with other mix-forming material.

It has been found advantageous in using mixtures of non-ferrous metals or alloys or mixtures thereof to treat the surface of the non-ferrous metals with an alkali wash which accelerates any reaction between the two materials while the batch is in the raw state, and prevents any reaction between the two types of metals during the firing period, and confines the reaction between the ceramic batch of the metallic addition agents.

Various changes may be resorted to within the spirit and scope of the invention.

I claim:

1. A refractory article containing mullite having finely divided metal incorporated therein, said metal having reaction characteristics substantially similar to that of the aluminum-magnesium group.

2. A refractory article containing mullite having finely divided aluminum incorporated therein.

3. A refractory article containing mullite having a finely divided aluminum-containing metal incorporated therein.

4. A crucible or pot containing mullite having finely divided metal incorporated therein, said metal having reaction characteristics substantially similar to that of the aluminum-magnesium group.

5. A crucible or pot containing mullite having finely divided aluminum incorporated therein.

6. A material for making a refractory article comprising mullite having incorporated therein a finely divided metal which controls the shrinkage of the material when in a plastic state.

7. A material for making a refractory article comprising mullite having incorporated therein finely divided aluminum.

8. A material for making a refractory article comprising mullite having incorporated therein a finely divided metal of the aluminum-magnesium group.

9. The method of making a refractory product consisting in mixing metal having reaction characteristics substantially similar to that of the aluminum-magnesium group in a finely divided form with material containing mullite and from which an article is to be formed.

10. The method of making a refractory product consisting in mixing aluminum metal in a finely divided form with material containing mullite and from which an article is to be formed.

11. The method of making a refractory article containing mullite, which consists in mixing finely divided metal having reaction characteristics substantially similar to that of the aluminum-magnesium group with the material from which the article is formed, and in forming the article.

12. The method of making a refractory article containing mullite which consists in mixing finely divided metal with a material convertible into mullite, and in forming the article and converting the material into mullite.

13. The method of making a refractory article containing mullite, which consists in mixing finely divided aluminum with bauxite and in forming the article and converting the bauxite into mullite.

14. The method of making a refractory crucible or pot which consists in mixing finely divided aluminum with bauxite, and in forming the article and electrically heating the same to convert the bauxite into mullite.

In testimony whereof I affix my signature.

HAROLD E. WHITE.

CERTIFICATE OF CORRECTION.

Patent No. 1,856,303.                                                  Granted May 3, 1932, to

HAROLD E. WHITE.

It is hereby certified that the name of the assignee in the above numbered patent was erroneously described and specified as "Lava Crucible Company", whereas said name should have been described and specified as Lava Crucible Company of Pittsburgh, as shown by the records of assignments in this office; and that the said Letters Patent should be read with this correction therein that the same may conform to the record of the case in the Patent Office.

Signed and sealed this 14th day of June, A. D. 1932.

(Seal)                                                            M. J. Moore,
                                                                       Acting Commissioner of Patents.